W. A. Clark.
Expansion Bit.
No. 3,516. Reissued Jun. 22, 1869.
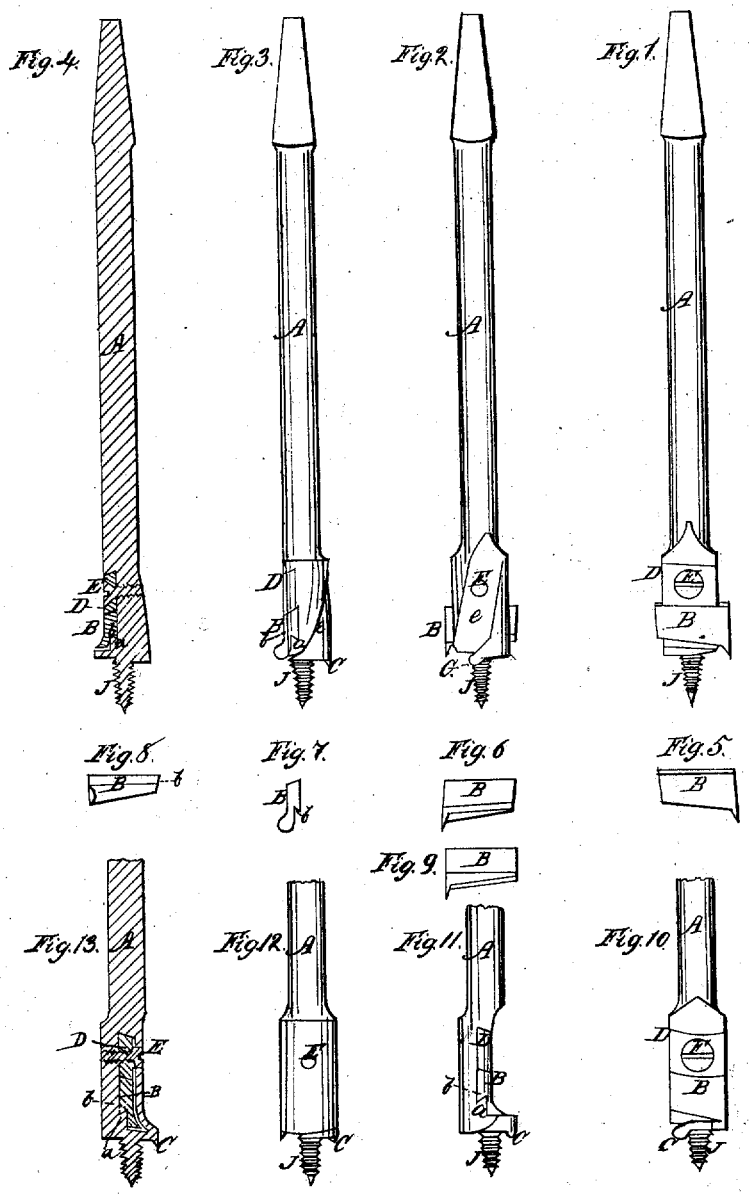
N. PETERS, PHOTO-LITHOGRAPHER, WASHINGTON, D. C.

UNITED STATES PATENT OFFICE.

WILLIAM A. CLARK, OF BETHANY, CONNECTICUT.

IMPROVEMENT IN EXPANSIVE BITS.

Specification forming part of Letters Patent No. 20,192, dated May 11, 1858; Reissue No. 3,516, dated June 22, 1869.

*To all whom it may concern:*

Be it known that I, W. A. CLARK, of Bethany, in the county of New Haven and State of Connecticut, have invented a new Improvement in Expansive Bits; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, an opposite side view; Fig. 3, an elevation, its plane of projection being transverse to Figs. 1 and 2; Fig. 4, a sectional elevation, its plane of projection being parallel to that in Fig. 3, but transverse to that in Figs. 1 and 2; Fig. 5, a side elevation of the movable cutter; Fig. 6, a reverse view of it; Fig. 7, an end elevation; Fig. 8, an inverted plan, or, in other words, an under side view; Fig. 9, a back side elevation of a cutter so made as to always keep the movable cutter at just the same distance behind the point of the bit, while at the same time the depth of wood left to support the central portion of the bit is varied by the adjustment of said cutter; Fig. 10, a side elevation of a bit embodying the same novel features as represented in the previous figures; but the stationary cutting-lip is formed in such a position upon the bit as to throw the chips in front of the movable cutter, which arrangement avoids the necessity of filing away the back side of the bit to allow the chips to pass; Fig. 11, an elevation transverse to Fig. 10; Fig. 12, a back side elevation of the same bit; and Fig. 13, a vertical section, showing the same movable cutter secured in the same way in a mortise instead of a recess in the body of the bit.

This invention relates to an improvement in what are known as "expansive bits"—that is, bits constructed with an adjustment whereby the cutter may be extended or contracted so as to cut a larger or smaller hole, as the case may be; and the invention consists in constructing and arranging the cutters so that all the chips made by both the fixed and adjustable cutters shall be delivered up the same side of the shank and over the face of the adjustable cutter, so that the other side of said shank may be left solid and entire; also, in forming a seat for the adjustable cutter to take its bearing above or away from the edge, the said cutter being held in its seat by the action of a screw brought to bear directly or indirectly upon the said cutter.

To enable others to fully understand my invention, I will proceed to describe the same as illustrated in the accompanying drawings.

A is the shank of the bit, upon which the inner or stationary cutter is formed, and in which the recess or mortise is made which receives the movable cutter B. The construction of the shank and of the cutting-lip permanently attached to it is very much the same as those of other expansive bits; but the mode of securing the movable cutter B in its place is different.

In my bit a V-shaped ledge, *a*, rises from the bottom of the recess in which the cutter B is secured to receive the V-shaped groove *b* in the said movable cutter. The form of the ledge *a* and that of the groove *b* is shown in Figs. 3, 4, 11, and 13. The form of the groove is also shown in Fig. 7. The form of the groove *b* and of the ledge upon which it rests is such as to give a firm bearing to the cutter B and draw it snugly against the back of the recess when the pressure is applied which secures the said cutter in place. The mode of securing this cutter is by means of the beveled plate or follower D, driven home by a screw, E, in such a manner as to press the cutter B against the back side and bottom of the recess in which it is secured, the said cutter being also beveled, as shown, to facilitate the accomplishment of this purpose. The form and arrangement of these parts are shown in Figs. 1, 3, 4, 10, 11, and 13. In the first four figures the relative positions of the cutters are such as to deliver the chips from the stationary cutter C upon the back side of that part of the stock which supports the movable cutter, and this involves the necessity of cutting away the stock, as shown at *e* in Figs. 2 and 3, to allow the chips to pass. This of course weakens that part of the stock and makes it necessary to secure sufficient strength by retaining more metal on the side upon which the cutter B is attached, and as a consequence the edge of this cutter is thrown out too far from the center of the stock, and its efficiency of operation in different positions is thereby reduced. To obviate this difficulty I have conceived the plan of forming the lip C in that position upon the stock in which it is represented in Figs. 10, 11, 12, and 13, by which arrangement the chips from it are delivered upon that side of the stock which is cut away to receive the cutter B, which allows the opposite side to be left entire, and also so balances the operating parts as to relieve the screw J from a portion of the pressure which would otherwise be thrown upon it when in operation. This arrangement enables me to bring the edge of the cutter B nearly back to the center of the stock, as shown in Fig. 11, and in large bits it may be brought farther back than it is there represented as being placed.

It may in some cases be considered desirable, in the construction of very large bits, to leave a portion of metal in front of the cutter B, as shown in Fig. 13, for the more effectual support of that side of the bit. In this case the screw E should extend through this part, as shown.

The mode which I have above described of supporting and securing the cutter B supports it without its resting on the cutting-edge, and in my construction space is left under the cutting-edge, as shown; and by thus supporting it the edge of a large cutter may be set higher in the stock than it is necessary or best to set the edge of a small one, which allows more wood to be left near the stock to support it when a large cutter is used. The cutting-edge of the cutter B is inclined, so as to bring its working end lower than the other for the twofold purpose of causing the unemployed end to clear the wood and of leaving a portion of the wood around the central portion of the bit to support it, while at the same time the outer end of the cutter B shall cut nearly or quite as far in advance as the inner cutter. The seat upon which the movable cutter rests, at the bottom, has in most expansive bits an inclination corresponding with that of the edge of the said cutter, and this feature is retained in my bit, as represented in all the drawings except Fig. 9. When so constructed, the sliding of the movable cutter outward also carries its working end downward, so that when placed in its extreme outward position it will cut considerably deeper than when withdrawn, so as to cut its minimum hole. It is desirable, however, that the depth it will cut shall be as nearly equal as possible, and, further, it becomes necessary, when the movable cutter is required, to cut away a very large amount of wood, to preserve a considerable shoulder of the wood adjacent to the stock for its support against the strain imposed upon it by the resistance against the movable cutter. For this purpose I make my longer cutters so that the edge shall stand a little higher in the stock than the edges of those which are intended to cut a smaller hole, which my mode of supporting the cutters upon a ledge or shoulder placed above the edge enables me to do, and this provision for giving the proper shoulder and depth of cut answers very satisfactorily for most purposes. Should greater nicety in these respects be desirable, it may be attained by the adoption of the cutter shown in Fig. 9, and the use of a horizontal V in the stock, as in this case the edge of the cutter is inclined with reference to the groove *b*, while in the cutters shown in the previous figures it is parallel to it. This arrangement causes the point of the movable cutter to always work at the same depth, and makes the depth of the shoulder in exact proportion to the distance at which the point of the cutter is set from the center.

Bits with movable cutters secured in a mortise in the shank or stock have been long known; but the modes which have been adopted for securing these cutters have been more or less objectionable, so much so as to interfere with their general use. One objection is that the bit, or more properly the movable cutter, being secured by being keyed down upon the bottom of the mortise, the cutting-edge of this movable cutter rests upon the middle of the stock, which not only destroys the cutting-edge of wood-boring tools, but also precludes such an arrangement as would allow a greater depth of wood to be left contiguous to the central cutter or stock to support it when a larger cutter is put in or a larger hole bored which requires such support for the stock. These objections are entirely overcome by my invention.

Having fully described my invention, what I claim as new and useful, and desire to secure by Letters Patent, is—

1. The construction of the shank so as to form a seat or bearing for the adjustable cutter, so that the said cutter will take its bearing above or back of the edge, the said cutter being held into its seat by the action of a set-screw brought to bear upon the cutter, substantially as described, and for the purpose set forth.

2. The arrangement of the fixed and expansive cutters C B on opposite sides of their axis, when constructed to operate as shown and described.

WM. A. CLARK.

Witnesses:
A. C. TIBBITS,
J. H. SHUMWAY.